United States Patent
Park

(10) Patent No.: US 10,027,945 B2
(45) Date of Patent: Jul. 17, 2018

(54) 3-DIMENSIONAL CAMERA MODULE AND METHOD FOR AUTO FOCUSING THE SAME

(71) Applicant: LG INNOTEK CO., LTD., Seoul (KR)

(72) Inventor: Kyong Nam Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 824 days.

(21) Appl. No.: 14/361,627

(22) PCT Filed: Dec. 6, 2012

(86) PCT No.: PCT/KR2012/010512
§ 371 (c)(1),
(2) Date: May 29, 2014

(87) PCT Pub. No.: WO2013/089386
PCT Pub. Date: Jun. 20, 2013

(65) Prior Publication Data
US 2014/0333725 A1    Nov. 13, 2014

(30) Foreign Application Priority Data
Dec. 16, 2011 (KR) .................. 10-2011-0136117

(51) Int. Cl.
*H04N 13/02* (2006.01)
*H04N 5/232* (2006.01)
*H04N 5/225* (2006.01)

(52) U.S. Cl.
CPC ..... *H04N 13/0203* (2013.01); *H04N 5/23212* (2013.01); *H04N 13/0239* (2013.01); *H04N 13/0296* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 2002/0190230 A1* | 12/2002 | Dworkowski | ....... | B23K 26/048 250/559.38 |
| 2009/0167930 A1* | 7/2009 | Safaee-Rad | ............ | G02B 7/38 348/347 |
| 2011/0109727 A1* | 5/2011 | Matsuura | ........... | H04N 5/23212 348/47 |
| 2012/0262595 A1* | 10/2012 | Kishida | .................... | G02B 7/08 348/220.1 |

FOREIGN PATENT DOCUMENTS

| | | |
|---|---|---|
| JP | 2009-522683 A | 6/2009 |
| KR | 10-2002-0021707 A | 3/2002 |
| KR | 10-2007-0087316 A | 8/2007 |
| KR | 10-2009-0035880 A | 4/2009 |

OTHER PUBLICATIONS

International Search Report in International Application No. PCT/KR2012/010512, filed Dec. 6, 2012.

* cited by examiner

*Primary Examiner* — Dakshesh D Parikh
(74) *Attorney, Agent, or Firm* — Saliwanchik, Lloyd & Eisenschenk

(57) ABSTRACT

An exemplary embodiment of the present invention is such that an auto focus search section of a first actuator and an auto focus search section of a second actuator are different to thereby optimize an auto locus effect of the 3-D camera module.

16 Claims, 2 Drawing Sheets

[Fig. 1]
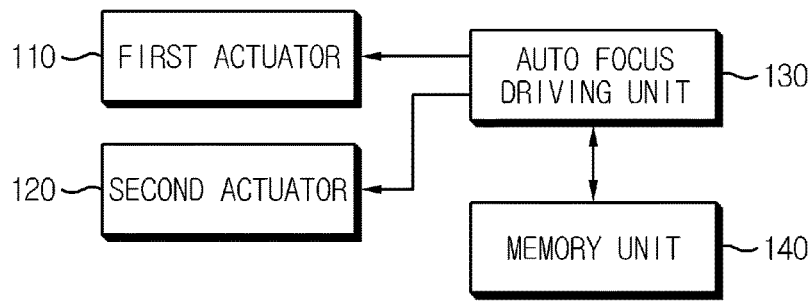
[Fig. 2]
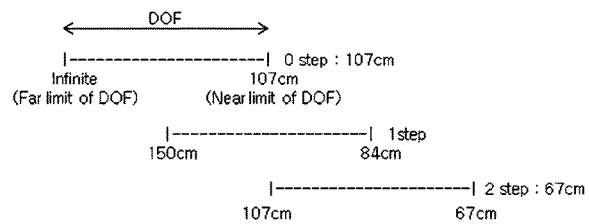
[Fig. 3]
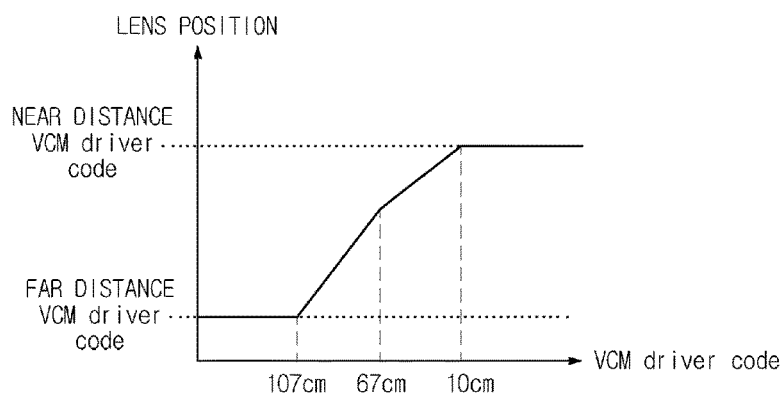
[Fig. 4]
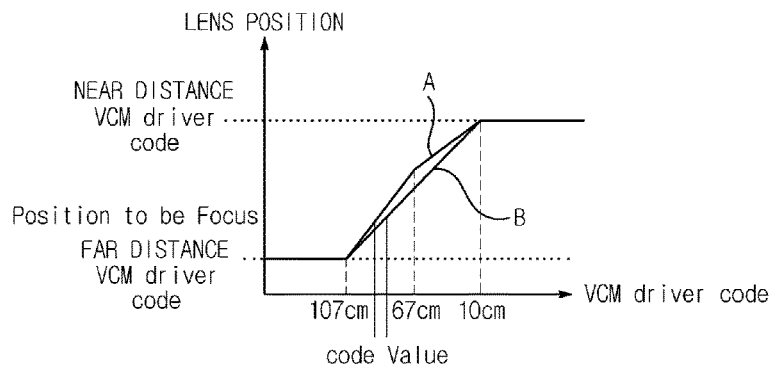

[Fig. 5]
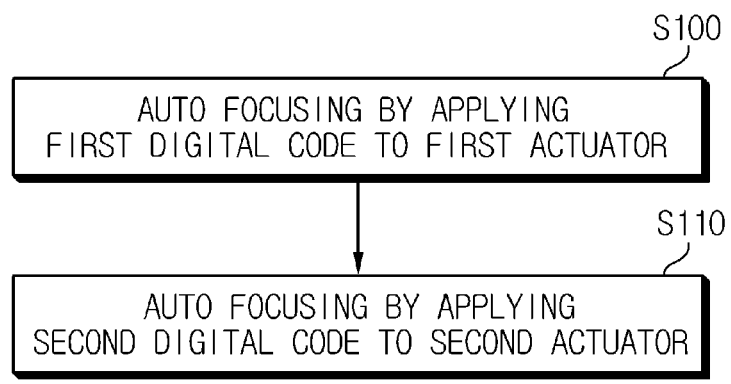

3-DIMENSIONAL CAMERA MODULE AND METHOD FOR AUTO FOCUSING THE SAME

CROSS-REFERENCE TO RELATED APPLICATIONS

This application is the U.S. national stage application of International Patent Application No. PCT/KR2012/010512, filed Dec. 6, 2012, which claims priority to Korean Application No. 10-2011-0136117, filed Dec. 16, 2011, the disclosures of each of which are incorporated herein by reference in their entirety.

TECHNICAL FIELD

The teachings in accordance with exemplary and non-limiting embodiments of this invention relate generally to a 3-dimensional camera module camera module and a method for auto focusing the same.

BACKGROUND ART

Although a currently-marketed 3D (Dimensional) camera with a VCM (Voice Coil Motor) is structured to perform an auto focus, the auto focus can be performed only in 2D (Dimensional) camera mode. In order to perform the auto focus in 3D camera mode, a left camera and a right camera must be situated on a same position during auto focusing operation. However, the conventional 3D camera lacks a function capable of grasping the same lens position information between two cameras to disable the auto focus in a 3D mode.

For example, in case of a camera of 5 M pixel level that performs no auto focus, a 3D effect can be largely accomplished only on an object within 2-3 m distance. Generally, in order to detect an accurate position of a lens, a VCM uses a detection sensor such as a Hall sensor, but if the Hall sensor is used, a camera module tends to be disadvantageously increased in size.

The auto focus is generally operated by applying, to a VCM, a voltage of an 8-bit code or a 10-bit code on an AF driver IC. If same codes are applied for laying lenses of two cameras on a same position, the two cameras may not be able to precisely capture an object due to a fine minute difference in operational ranges for each VCM and lens deviation.

DISCLOSURE OF INVENTION

Technical Problem

Accordingly, the present invention has been made keeping in mind the above disadvantages/problems occurring in the prior art, and an object of the present invention is to provide a 3D camera module configured to optimize auto focus of the 3D camera module, and a method for auto focusing the same.

Solution to Problem

In one general aspect of the present invention, there is provided a 3-D camera module, the 3-D camera module comprising: a first actuator moving a first lens unit including at least one or more lenses; a second actuator moving a second lens unit including at least one or more lenses; a memory unit stored with a first look-up table recorded with a first digital code that is separated by a plurality of steps defined by DOF (Depth Of Field), where an initial step is not overlapped with a next step among the plurality of steps, and a lens position of the first lens unit corresponding to a first digital code, and a second look-up table recorded with a lens position of a second lens unit corresponding to a second digital code, where the second digital code is separated by a plurality of steps defined by DOF (Depth Of Field), and overlapped with the plurality of steps; and an auto focus driving unit driving the first actuator using the first digital code of the first look-up table stored in the memory unit, and driving the second actuator using the second digital code of the second look-up table.

In some exemplary embodiments, the first lens unit may be a right eye lens unit, and the second lens unit may be a left eye lens unit.

In some exemplary embodiments, the initial step may be 0 step, and the next step may be 2 step.

In some exemplary embodiments, the initial step may be from infinite to 107 cm, and the 2 step may be 107 cm~67 cm.

In some exemplary embodiments, each of the first and second actuators may be one of a VCM (Voice Coil Motor) actuator, an actuator driven by a piezoelectric force and a MEMS (Micro Electro Mechanical System) actuator driven by electrostatic capacity method.

In another general aspect of the present disclosure, there is provided a 3-D camera module, the 3-D camera module comprising: a first lens unit; a second lens unit discrete from the first lens unit; a first actuator having a first auto focus search section and moving the first lens unit; and a second actuator having a second auto focus search section different from the first auto focus search section and moving the second lens unit.

In some exemplary embodiments, the first lens unit may be a right eye lens unit, and the second lens unit may be a left eye lens unit.

In some exemplary embodiments, the initial step may be 0 step, and the next step may be 2 step.

In some exemplary embodiments, each of the plurality of steps may be separated by DOF (Depth Of Field).

In still another general aspect of the present invention, there is provided a 3-D camera module, the 3-D camera module comprising: a first actuator moving a first lens unit: a second actuator moving a second lens unit; and an auto focus driving unit driving the first actuator using a first digital code where an initial step is not overlapped with a next step among a plurality of steps, and driving the second actuator using a second digital code overlapped with a plurality of steps.

In some exemplary embodiments, the initial step may be 0 step, and the next step may be 2 step.

In some exemplary embodiments, the initial step may be from infinite to 107 cm, and the 2 step may be 107 cm~67 cm.

In some exemplary embodiments, each of the first and second actuators may be one of a VCM (Voice Coil Motor) actuator, an actuator driven by a piezoelectric force and a MEMS (Micro Electro Mechanical System) actuator driven by electrostatic capacity method.

In some exemplary embodiments, each of the plurality of steps may be separated by DOF (Depth Of Field).

In still further aspect of the present invention, there is provided a method for auto focusing a camera module, the method comprising: auto focusing by applying, to a first actuator, a first digital code separated by a plurality of steps where an initial step is not overlapped with a next step among the plurality of steps, in order to move a first lens unit; and auto focusing by applying, to a second actuator, a second digital code overlapped with the plurality of steps, in order to move a second lens unit.

In some exemplary embodiments, the step of auto focusing by applying to the first actuator in order to move the first lens unit, and the step of auto focusing by applying to second actuator in order to move the second lens unit may be simultaneously performed.

In some exemplary embodiments, each of the plurality of steps may be separated by DOF (Depth Of Field).

In some exemplary embodiments, the initial step may be 0 step, and the next step may be a 2 step.

In some exemplary embodiments, the initial step may be from infinite to 107 cm, and the 2 step may be 107 cm~67 cm.

In some exemplary embodiments, an auto focus section of the step of auto focusing by applying the first digital code to the first actuator may be different from an auto focus section of the step of auto focusing by applying the second digital code to the second actuator.

Advantageous Effects of Invention

A camera module according to the present invention has an advantageous effect in that a first search section and a second search section are different to optimize an auto focus of a 3-D camera module having two lens units of a first lens unit and a second lens unit.

Another advantageous effect is that lens positions to be focused can be located on a same position in auto focus search section of a first actuator and an auto focus search section of a second actuator, and digital values of same lens position can be differently set to thereby enhance an auto focus effect of a 3-D camera module.

BRIEF DESCRIPTION OF DRAWINGS

FIG. 1 is a block diagram illustrating a 3-D camera module according to an exemplary embodiment of the present invention.

FIG. 2 is a conceptual view illustrating a first digital code stored in a memory unit of a 3-D camera module according to an exemplary embodiment of the present invention.

FIG. 3 is a performance curve graph of an actuator using DOF of FIG. 2.

FIG. 4 is performance curve graphs of first and second actuators of a 3-D camera module according to an exemplary embodiment of the present invention.

FIG. 5 is a flowchart of a method for auto focusing a 3-D camera module according to an exemplary embodiment of the present invention.

BEST MODE FOR CARRYING OUT THE INVENTION

Now, exemplary embodiments of the present invention will be described in detail with reference to the accompanying drawings.

In the drawings describing the present invention, the size and relative sizes of layers, regions and/or other elements may be exaggerated or reduced for clarity and convenience. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

FIG. 1 is a block diagram illustrating a 3-D camera module according to an exemplary embodiment of the present invention.

The 3-D camera module according to an exemplary embodiment of the present invention includes a first actuator (110) moving a first lens unit including at least one or more lenses, a second actuator (120) moving a second lens unit including at least one or more lenses, a memory unit (140) stored with a first look-up table recorded with a first digital code that is separated by a plurality of steps defined by DOF (Depth Of Field), where an initial step is not overlapped with a next step among the plurality of steps, and a lens position of the first lens unit corresponding to a first digital code, and a second look-up table recorded with a lens position of the first lens unit corresponding to a second digital code, where the second digital code is separated by a plurality of steps defined by DOF (Depth Of Field), and overlapped with the plurality of steps; and an auto focus driving unit (130) driving the first actuator (110) using the first digital code of the first look-up table stored in the memory unit, and driving the second actuator (120) using the second digital code of the second look-up table.

Thus, an auto focus device of a 3-D camera module according to an exemplary embodiment of the present invention is configured such that the auto focus driving unit (130) drives the first actuator (110) using the first digital code of the first look-up table stored in the memory unit (140), and drives the second actuator (120) using the second digital code of the second look-up table, thereby performing the auto focus of the first and second lens units.

At this time, the first lens unit may be a right eye lens unit, and the second lens unit may be a left eye lens unit, and the reverse may apply too. Furthermore, the first and second actuators (110, 120) move the lenses of the first and second lens units of the 3-D camera module along a direction of an optical axis for auto focusing. Still furthermore, each of the first and second actuators is one of a VCM (Voice Coil Motor) actuator, an actuator driven by a piezoelectric force and a MEMS (Micro Electro Mechanical System) actuator driven by electrostatic capacity method.

FIG. 2 is a conceptual view illustrating a first digital code stored in a memory unit of a 3-D camera module according to an exemplary embodiment of the present invention, FIG. 3 is a performance curve graph of an actuator using DOF of FIG. 2, and FIG. 4 is performance curve graphs of first and second actuators of a 3-D camera module according to an exemplary embodiment of the present invention.

As noted above, the first digital code (i.e., corresponding to a current value) applied to the first actuator is separated using DOF (Depth Of Field) which is a lens characteristic, where the initial step and the next step are not overlapped among the plurality of steps. At this time, in a case the digital code is separated to the plurality of steps using the DOF (Depth Of Field), neighboring steps exist with overlapped regions. That is, as shown in FIG. 2, 0 step and 1 step are overlapped, and 1 step and 2 step are overlapped.

The present invention is such that an auto focus search of an actuator auto focusing one lens unit of the 3-D camera module is made to have an actuator characteristic as shown in FIG. 3 by 0 step, where DOF is not overlapped or a substantially overlapped region is extremely small, being connected to 2 step. Successively, 1 step is deleted, and the search is connected to directly to 2 step from 0 step.

Furthermore, the 0 step is from infinite to 107 cm, and the 2 step is 107 cm~67 cm, based on an imaging distance. That is, an initial step not overlapped is 0 step, and the next step is a 2 step.

Still furthermore, the reason of using 'near limit of DOF' in 2 step is that a 3-D effect is not properly expressed below the near limit of DOF. For reference, conditions of FIG. 2 are that F-NO (F-Number) is 2.4, an EFL (Effective Focal Length) is 3.2, a size of sensor pixel is 1.12 μm, and a focusing distance is 150 cm.

Thus, the first digital code applied to the first actuator is separated by plurality of steps defined by DOF, and an initial step and the next step are not overlapped among the plurality of steps, such that an auto focus search section from a far distance of the first actuator to a near distance is 'A' of FIG. 4.

Furthermore, the second digital code applied to the second actuator is separated by a plurality of steps defined by DOF, and the plurality of steps is overlapped, such that an auto focus search section from a far distance of the second actuator to a near distance is 'B' of FIG. 4.

Therefore, the present invention is advantageously configured such that the auto focus search section of the first actuator and that of the second actuator are different to optimize the auto focus of the 3-D camera module having two lens units of the first and second lens units.

In addition, as illustrated in FIG. 4, the auto focus search section 'A' of the first actuator and the auto focus search section 'B' of the second actuator can place the lens position on a same position, and digital code values of same lens positions can be differently set to thereby enhance an auto focus effect of the 3-D camera module.

MODE FOR THE INVENTION

FIG. 5 is a flowchart of a method for auto focusing a 3-D camera module according to an exemplary embodiment of the present invention.

The method for auto focusing a camera module is performed as follows:

First, auto focus is performed by applying a first digital code separated by a plurality of steps defined by DOF, where an initial step is not overlapped with a next step among the plurality of steps, to a first actuator in order to a first lens unit (S100).

Auto focusing is performed by applying, to a second actuator, a second digital code separated by a plurality of steps defined by DOF and overlapped with the plurality of steps in order to move a second lens unit (S110), where the 'S100' and 'S110' are simultaneously performed. Thus, the auto focus of the first and second lens units of the 3-D camera module can be performed.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The 3-D camera module according to exemplary embodiments of the present invention has an industrial applicability in that an auto focus search section of a first actuator and an auto focus search section of a second actuator are different to thereby optimize an auto focus effect of the 3-D camera module.

The invention claimed is:

1. A 3-D camera module comprising:
a first actuator moving a first lens unit including at least one or more lenses;
a second actuator moving a second lens unit including at least one or more lenses;
a memory unit stored with a first look-up table and a second lookup table; and
an auto focus driving unit driving the first actuator using a first digital code of the first look-up table stored in the memory unit, and driving the second actuator using a second digital code of the second look-up table;
wherein the first look-up table is recorded with the first digital code that is separated by a plurality of steps defined by DOF (Depth Of Field), where an initial step is not overlapped with a next step among the plurality of steps;
wherein a position of the first lens unit corresponds to the first digital code, and the second look-up table is recorded with the position of the first lens unit corresponding to the second digital code, where the second digital code is separated by the plurality of steps defined by DOF and is overlapped with the plurality of steps;
wherein the auto focus driving unit simultaneously drives the first actuator and the second actuator, and the first actuator and the second actuator respectively search a first auto focus search section and a second auto focus search section; and
wherein the first actuator and the second actuator place the position of the first lens unit and a position of the second lens unit on a same position, and a digital code value of the position of the first lens unit and a digital code value of the position of the second lens unit are differently set on the same position, when the position of the first lens unit is on focus by the first actuator in the first auto focus search section, and the position of the second lens unit is on focus by the second actuator in the second auto focus search section.

2. The 3-D camera module of claim 1, wherein the first lens unit is a right eye lens unit, and the second lens unit is a left eye lens unit.

3. The 3-D camera module of claim 1, wherein the initial step is 0 step, and the next step is 2 step,
wherein the initial step is from infinite to 107 cm, and the 2 step is 107 cm~67 cm, and
wherein 1 step overlapped with at least one of 0 step and 2 step is deleted.

4. The 3-D camera module of claim 1, wherein each of the first and second actuators is one of a VCM (Voice Coil Motor) actuator, an actuator driven by a piezoelectric force, and a MEMS (Micro Electro Mechanical System) actuator driven by electrostatic capacity method, and moves the first lens unit and the second lens unit of the 3-D camera module along a direction of an optical axis for auto focusing.

5. A 3-D camera module, the 3-D camera module comprising:
a first lens unit;
a second lens unit discrete from the first lens unit;
a memory unit stored with a first look-up table and a second look-up table;
a first actuator having a first auto focus search section and moving the first lens unit; and a second actuator having a second auto focus search section different from the first auto focus search section and moving the second lens unit;
wherein the first actuator is driven using a first digital code of the first look-up table stored in the memory unit, and the second actuator is driven using a second digital code of the second look-up table stored in the memory unit,
wherein the first auto focus search section includes an initial step that is not overlapped with a next step among a plurality of steps defined by DOF (Depth Of Field), and the second auto focus search section includes at least one step overlapped with another step among the plurality of steps defined by DOF;
wherein the at least one step overlapped with another step corresponds to a position of the first lens unit,
wherein the first actuator and the second actuator simultaneously search the first auto focus search section and the second auto focus search section, and
wherein the first actuator and the second actuator place the position of the first lens unit and a position of the second lens unit on a same position, and a digital code value of the position of the first lens unit and a digital code value of the position of the second lens unit are differently set on the same position, when the position of the first lens unit is on focus by the first actuator in the first auto focus search section, and the position of the second lens unit is on focus by the second actuator in the second auto focus search section.

6. The 3-D camera module of claim 5, wherein the first lens unit is a right eye lens unit, and the second lens unit is a left eye lens unit.

7. The 3-D camera module of claim 5, wherein the initial step is 0 step, and the next step is 2 step,
wherein the initial step is from infinite to 107 cm, and the 2 step is 107 cm~67 cm, and
wherein 1 step overlapped with at least one of 0 step and 2 step is deleted.

8. A 3-D camera module comprising:
a first actuator moving a first lens unit:
a second actuator moving a second lens unit;
a memory unit stored with a first look-up table and a second look-up table, wherein the first look-up table comprises a first digital code and the second look-up table comprises a second digital code;
an auto focus driving unit driving the first actuator using the first digital code where an initial step is not overlapped with a next step among a plurality of steps, and driving the second actuator using the second digital code overlapped with a plurality of steps;
wherein the second digital code corresponds to a position of the first lens unit,
wherein the auto focus driving unit simultaneously drives the first actuator and the second actuator, and the first actuator and the second actuator respectively search a first auto focus search section and a second auto focus search section; and
wherein the first actuator and the second actuator place the position of the first lens unit and a position of the second lens unit on a same position, a digital code value of the position of the first lens unit and a digital code value of the position of the second lens unit are differently set on the same position, when the position of the first lens unit is on focus in the first auto focus search section, and the position of the second lens unit is on focus in the second auto focus search section are same.

9. The 3-D camera module of claim 8, wherein the initial step is 0 step, and the next step is 2 step,
wherein the initial step is from infinite to 107 cm, and the 2 step is 107 cm~67 cm, and
wherein 1 step overlapped with at least one of 0 step and 2 step is deleted.

10. The 3-D camera module of claim 8, wherein each of the first and second actuators is one of a VCM (Voice Coil Motor) actuator, an actuator driven by a piezoelectric force and a MEMS (Micro Electro Mechanical System) actuator driven by electrostatic capacity method, and moves the first lens unit and the second lens unit of the 3-D camera module along a direction of an optical axis for auto focusing.

11. The 3-D camera module of claim 8, wherein each of the plurality of steps is separated by DOF (Depth Of Field).

12. A method for auto focusing a camera module, the method comprising:
auto focusing by applying, to a first actuator, a first digital code separated by a plurality of steps where an initial step is not overlapped with a next step among the plurality of steps, in order to move a first lens unit; and
auto focusing by applying, to a second actuator, a second digital code overlapped with the plurality of steps, in order to move a second lens unit;
wherein the first digital code is contained in a first look-up table stored in a memory unit and the second digital code is contained in a second look-up table stored in the memory unit,
wherein the second digital code corresponds to a position of the first lens unit,
wherein the auto focusing of the first actuator and the auto focusing of the second actuator are simultaneously performed, and
wherein the position of the first lens unit and a position of the second lens unit are placed on a same lens position, and a digital code value of the position of the first lens unit and a digital code value of the position of the second lens unit are differently set on the same position, when the position of the first lens unit is on focus by the first actuator, and the position of the second lens unit is on focus by the second actuator.

13. The method of claim 12, wherein the step of auto focusing by applying to the first actuator in order to move the first lens unit and the step of auto focusing by applying to the second actuator in order to move the second lens unit are simultaneously performed.

14. The method of claim 12, wherein each of the plurality of steps is separated by DOF (Depth Of Field).

15. The method of claim 14, wherein the initial step is 0 step, and the next step is a 2 step,
wherein the initial step is from infinite to 107 cm, and the 2 step is 107 cm~67 cm, and
wherein 1 step overlapped with at least one of 0 step and 2 step is deleted.

16. The method of claim 13, wherein the auto focus section of the step of auto focusing by applying the first digital code to the first actuator is different from an auto focus section of the step of auto focusing by applying the second digital code to the second actuator.

* * * * *